April 30, 1963  PAUL KONIEWIEZ NOW BY CHANGE  3,087,798
OF NAME PAUL KORWIN ETAL
SEALING UNIT FOR ROTARY KILN
Filed July 7, 1960
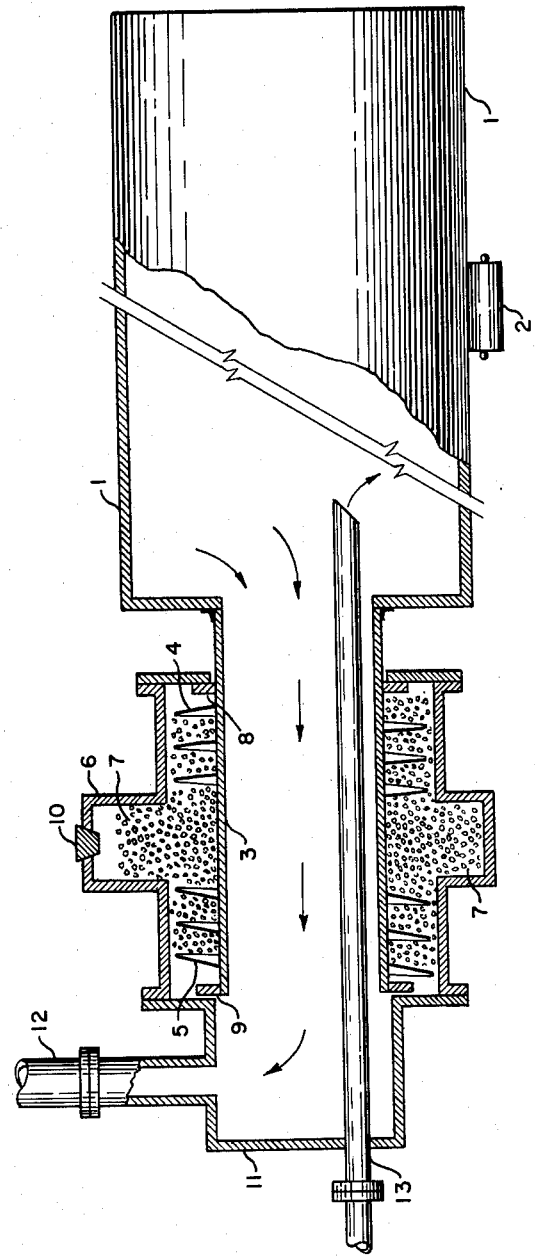
PAUL KONIEWIEZ
GEORGE RUSSELL JAMES
INVENTORS
BY J. T. Chaboty
AGENT

United States Patent Office 3,087,798
Patented Apr. 30, 1963

3,087,798
SEALING UNIT FOR ROTARY KILN
Paul Koniewiez, Flushing, and George Russell James, Armonk, N.Y., assignors to Chemical Construction Corporation, New York, N.Y., a corporation of Delaware; said Paul Koniewiez now by change of name Paul Korwin
Filed July 7, 1960, Ser. No. 41,364
5 Claims. (Cl. 23—284)

This invention relates to rotary reaction vessels, such as kilns, in which chemical process reactions are performed while the vessel is being rotated. A sealing unit has been developed which provides an improved closure against escape of fluid reaction components, such as poisonous or valuable gases, from the interior of the rotating vessel. The sealing unit allows the vessel to rotate freely while providing positive closure between rotating and stationary elements. The apparatus of the present invention is applicable to instances where a fluid feed is reacted or converted to produce gaseous and solid reaction products. Other typical applications are found in which a solid feed is treated with liquid, whereby a gaseous product is withdrawn.

Various industrial processes involve reaction in a sealed rotating vessel, with simultaneous withdrawal of a gaseous product or byproduct. Some processes of interest involve a sequence of process steps of a reverse nature, in which a gaseous reactant is passed into a sealed rotating vessel and solid or liquid product is withdrawn. Among these various processes may be mentioned those employing rotary kilns for high temperature thermal processing or drying of solids. In numerous instances the complete recovery of a gaseous component from the system is economically desirable, particularly when this component is the desired product of the process. In some instances complete recovery is essential for various reasons, such as when the gaseous component is poisonous or acts to pollute the atmosphere.

Typical of such situations is the production of hydrofluoric acid. This product is commercially produced by reacting solid calcium fluoride with sulfuric acid in a reaction kiln which is rotated to insure complete reaction. Hydrogen fluoride is generated and withdrawn as a gas. This compound is very poisonous and highly corrosive, and consequently, the rotating reaction vessel must be thoroughly sealed against the atmosphere to prevent leakage. Usually the vessel is maintained at a pressure slightly below atmospheric, so that any leakage will result in a flow of air into the vessel rather than an outward flow of hydrogen fluoride. However, process upsets may occur resulting in a generation of a positive pressure within the vessel and leakage of lethal gas. In addition, the inward flow of air reduces overall process efficiency.

Numerous types of mechanical or lubricated seals have been suggested or employed in various installations, however, these sealing means are open to various objections. Displacement of the apparatus due to wear or corrosive effect of the reaction product may cause a misfit of mechanical seals, while lubricated seals are also troublesome due to inevitable incorporation of solid material into the sealant. In addition, the kiln ends are subject to numerous variable forces in practice which tend to produce non-circular movement. Besides the basic kiln rotation, other significant factors include radial and longitudinal expansion of the shell due to thermal operations, deflection of the shell under load, possible misalignment during assembly, wear of tires and rollers, and shocks due to internal breaking bars within the kiln. These various objections and defects of prior art apparatus are eliminated by the apparatus of the present invention.

In the present invention, an apparatus arrangement is provided in which a suitable solid particulate or pulverized material acts as a sealant at the interface between rotating and stationary elements. The material to be employed in a particular instance will depend on various factors. Basically, the material must be free-flowing, a condition which is readily achieved with smaller particle size. For effective sealing against a gaseous component it is essential that the gas phase should not be able to permeate or penetrate through a reasonable depth of the particulate sealant material, under the anticipated pressure or vacuum conditions to be encountered. The material must be chemically inert or non-reactive with the reaction components encountered in the particular application, such as product gas. The reasons for these essentially empirical requirements will become evident as the apparatus of the present invention is described.

The apparatus of the present invention includes a rotary kiln or other vessel which is rotated about a horizontal or inclined axis, together with an attached conduit which extends from an axial opening in one end of the kiln. The conduit is arranged so as to rotate coaxially with the kiln, and in addition the conduit is provided with two groups of helicoid spiral flighting. The groups of flighting are attached to the outer surface of the conduit, and promote opposing motions of solid particulate matter when the kiln is rotated. A stationary solids retention container is provided around the flightings, and serves to hold the solid particulate matter. In operation, the action of the opposing flightings maintains a level or head of solid particulate matter which serves as an effective seal against gas flow in the interface between the moving and stationary elements of the apparatus. A stationary transfer duct is provided at the end of the rotating conduit. This duct is attached to the solids retention chamber, so as to provide means for passage of fluid or solid material to other stationary external process units while the rotary kiln is in motion. The available space between the flightings and the stationary container provides inherent adjustment for absorption of misalignment due to the factors described supra.

It should be evident from the foregoing description that selection of an appropriate solid particulate material will depend on the particular process conditions and reactants to be encountered. Thus, among the various materials which may prove suitable in particular instances are talc, gypsum, borax, carbon black, ground glass, powdered alumina, etc. In many cases one of the solid reaction feed components or products is eminently suitable for utilization as the solid sealant material. As will appear infra, it has been determined that ground fluorspar is highly acceptable and may be readily utilized as the solid sealant material in hydrofluoric acid manufacture.

It is an object of this invention to provide an improved sealing unit for rotary reaction vessels.

Another object is to provide a sealing unit which utilizes solid particulate material as the sealing medium.

A further object is to provide a sealing unit for rotary reaction vessels which permits the simultaneous ingress or egress of reaction components between the vessel and other stationary process units while preventing escape or leakage of gaseous components.

An additional object is to provide a sealing unit for rotary reaction vessels which may employ solid reaction component as a sealant to prevent gas leakage.

These and other objects and advantages of the present invention will become evident from the description which follows.

Referring to the FIGURE, which illustrates in combination a preferred embodiment of the present invention, rotary reaction kiln 1 is supported and revolved on roller means 2. Circular conduit 3 is coaxially attached at the end of kiln 1, and revolves with the motion of the kiln. A first helicoid spiral flighting or screw thread type conveyor 4 is attached to the external surface of conduit 3 at the section of conduit 3 adjacent kiln 1, and serves to convey adjacent solids in a direction away from kiln 1 when the kiln and attached conduit 3 are in motion. A second helicoid spiral flighting 5 is attached to the external surface of conduit 3 towards the open end of said conduit. Flighting 5 performs a function similar to flighting 4, however, solids motion is in an opposite direction, namely towards kiln 1. Solids retention container 6 is a stationary unit disposed about flights 4 and 5, and serves to retain solid particulate material 7 at a desired level and disposed about flightings 4 and 5. End rings 8 and 9 do not provide sealing against gas flow but merely serve to retain overflowing solid material 7 within container 6. Plug 10 is provided in container 6 so that the level of sealant material 7 may be checked, and also to provide means for adding more material 7 to make up for losses.

Stationary transfer duct or chamber 11 is attached to chamber 6 and disposed about the open end of revolving conduit 3. Gas or fluid transfer means 12 is attached to duct 11 and serves to conduct gas or other fluid, to or from kiln 1. Likewise, pipe 13 serves a function similar to transfer means 12. As indicated on the figure by arrows, for purposes of illustration only pipe 13 is shown passing a liquid reaction component into kiln 1 while transfer means 12 is shown removing a gaseous reaction product. Thus in the case of hydrogen fluoride manufacture, pipe 13 would serve to disperse liquid sulfuric acid into kiln 1 while transfer means 12 would conduct product hydrogen fluoride gas to other process vessels not shown. Admittance of solid fluorspar and removal of solid calcium sulfate reaction product is accomplished by other means not shown. Obviously these other aspects of the process would also preferably be accomplished through conduit 3. Thus in numerous instances transfer of reaction components between kiln 1 and external stationary units is simultaneously accomplished at both ends of the kiln, by providing separate gas-tight seal assemblies at each end of the kiln.

In operation, the rotation of kiln 1 revolves attached conduit 3, which in turn results in motion of attached flightings 4 and 5. The motion of the flightings accomplishes a buildup and compression of solid particulate matter towards the center of container 6, and thus provides an effective plug seal against gas flow between revolving conduit 3 and stationary container 6. In this preferred embodiment, the central portion of container 6 below plug 10 is shown as an enlarged section. The basic purpose of this is to permit maintenance of a reservoir of solid material within the unit, to make up for operational losses and thus permit continuous operation with periodic makeup by addition of fresh material via plug 10. Another purpose of this arrangement is to provide a static head of solid particulate material so that the plug sealing effect is maintained when the kiln is not in motion.

As previously discussed, the solid particulate matter employed in a particular installation will depend on individual operating circumstances. Preferably, the material employed will be one of the solid reaction components, either a solid feed component or a solid reaction product. It should be understood that the apparatus of the present invention is limited to those cases in which it is possible for suitable solid material to act as a seal against gas flow. Usually the apparatus will be effective where a powdered or finely ground granular material may be employed as the solid particulate seal material. Of course when a prospective solid seal material is coarse-grained with effective intergranular void spaces, utilization of the present apparatus to effect gas sealing may not be possible, since in this case the gas could permeate through the entire body of solid material. In such cases the plug seal action generated by the apparatus of the present invention would not act to effectively prevent gas flow, and gas could escape through the apparatus. The possible application of the present invention to a specific installation is readily determined by a simple laboratory test, in which the depth of solid material required for zero gas flow is determined for the particular gas pressure differential to be encountered in the specific installation.

The feasibility of applying the apparatus of the present invention to hydrofluoric acid manufacture was conclusively shown by the following pilot plant study.

Tests of ground fluorspar were made to determine effectiveness of this material as a seal against gas flow. The fluorspar was ground to the standard fineness of size distribution specified for hydrogen fluoride production, and the amount of gas flow through a one foot thick bed was measured for various gas pressure differentials across the bed. The following results were obtained.

| Gas pressure differential (inches of water) | Gas leakage flow (cubic feet of gas per hour per square foot of bed) |
|---|---|
| 2 | 0 |
| 5 | 3.5 |
| 10 | 7.0 |

Since commercial hydrogen fluoride installations are usually operated with a kiln vacuum maintained at about 2 inches of water negative pressure, it is clearly evident that the apparatus of the present invention is readily applicable to such installations.

We claim:
1. Rotary kiln with gas-tight seal comprising a reaction kiln, means to rotate said kiln, a cylindrical conduit coaxially attached to said kiln and extending from an opening in said kiln whereby rotation of said kiln effects circular rotation of said conduit, a first helicoid spiral flighting attached to a first portion of the outer surface of said conduit adjacent to said kiln, said first flighting being pitched to provide motion of conveyed solids in a direction away from said kiln on rotation of said kiln, a second helicoid spiral flighting disposed about and attached to a second portion of the outer surface of said conduit, said second flighting being pitched to provide motion of conveyed solids in a direction towards said kiln on rotation of said kiln, a stationary solids container disposed about said first and second flightings whereby solid particulate seal material is retained about said first and second flightings, and a stationary transfer duct attached to said container and disposed about the open end of said conduit.

2. Apparatus of claim 1, in which said stationary solids container extends upwards above a portion of said conduit, whereby a reservoir of solid particulate seal material is established above the level of said flightings.

3. Apparatus of claim 1, in which said solid particulate seal material consists of one of the solid kiln reaction components.

4. Apparatus of claim 1, in which an externally supported stationary fluid transfer duct is extended into said kiln through said conduit, whereby fluid transfer between the interior of said kiln and stationary external fluid transfer means is accomplished while rotating said kiln.

5. Apparatus of claim 1, in which transfer of reaction components between said rotary kiln and external stationary transfer means takes place at both ends of said kiln, and separate sealing of each end of said kiln is provided by separate assemblies of said gas-tight seal apparatus.

References Cited in the file of this patent
UNITED STATES PATENTS

| | | |
|---|---|---|
| 982,182 | Johnston | Jan. 7, 1911 |
| 2,064,703 | Van de Graaff | Dec. 15, 1936 |
| 2,500,295 | Pierce | Mar. 14, 1950 |